July 27, 1954     E. SCHNEIDER     2,684,877

BEARING

Filed Oct. 11, 1950

INVENTOR.
ERNST SCHNEIDER

Patented July 27, 1954

2,684,877

UNITED STATES PATENT OFFICE 2,684,877

BEARING

Ernst Schneider, Wien, Austria

Application October 11, 1950, Serial No. 189,503

Claims priority, application Austria
October 18, 1949

8 Claims. (Cl. 308—26)

This invention relates to plain or slide bearings in which a shaft is in contact with and slides and revolves in a lubricated lining of the bearing. It has particular relation to bearings of this type, in which elastic membranes are used for taking up forces acting on the bearing.

The main object of my present invention is to provide a bearing construction in which the harmful effects of forces acting on the shaft beyond the bearing surfaces, are eliminated by elastic membranes which take up such forces.

Another object of my invention is to provide bearings of the above-mentioned type, in which the shaft can be displaced in axial direction.

It is also an object of my invention to provide bearings of the above outlined type, the load capacity of which is not dependent from the number of revolutions of the shaft.

Other objects and the advantages of the invention will be apparent from the appended drawings and the following specification and claims which describe, by way of example, some embodiments of my invention.

In the drawings

Figures 3a, 3b and 4 illustrate bearings embodying my present invention of which Figures 3a and 3b are in cross-section and Figure 4 is an end view.

Figure 1:
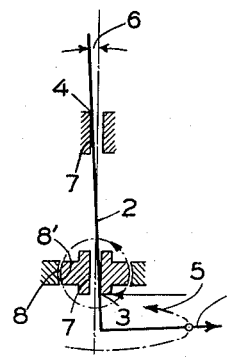
Figure 1 is the diagrammatical illustration of a plain bearing of known construction.

Every slide bearing of the type diagrammatically illustrated in Figure 1 has a certain play. If a force 1 acts on the shaft 2 beyond the bearings, for example at the end of the shaft as shown in Fig. 1, or if the bearings are not exactly aligned, or if the shaft is bent, the shaft comes in contact with slide surfaces 7 at two points, at 3 and 4, and brings about a high canting pressure which results in a wear of the contact points until the surfaces formed by such wear are large enough for taking up the forces at points 3 and 4. This causes an increase of the bearing play and has a rather adverse effect on the exactness of the operation of the bearing.

If force 1 acts on shaft 2 radially, changing its direction, for example by rotation in the direction indicated by arrow 5, the bearing becomes worn out along a cone, as indicated at 6. This can be eliminated by using a Sellers bearing which is a journal bearing with relatively long bearing bushings which are supported in spherical supports so that the bearing, according to the position of the shaft, can adapt itself to the shaft automatically without pressure on the edges. This type of bearing is shown and described for example in Laudin-Ebert-Quanz, Machinenelemente, vol. 2, page 62, and other textbooks on machine elements. In such a Sellers bearing the canting pressure at 3 is eliminated by forming its outer surface as a ball 8, the slide surface of which is automatically adjusted parallel to the shaft under the pressure of the shaft. If force 1 rotates in the direction of arrow 5, ball 8 will be caused to carry out an oscillating or tumbling movement in its own ball-shaped bearing in accordance with angle 6 of the cone. Thus, the ball becomes a second, oscillating bearing. The inner bearing surface can be omitted and the respective portion of the shaft 2 proper may be formed as a ball which rotates in bearing 8'. However, such bearings of the necessary exactness cannot be manufactured economically at present and, in the case of oscillating movements, they tend to destroy the slide surfaces, particularly owing to the fact that proper lubrication of such bearings is rather difficult. Moreover, in the use of such ball-shaped bearings, no axial displacement of the shaft is possible.

I have found that the above described difficulties can be eliminated according to my invention by using in the manner described hereinafter an elastic membrane for taking up the forces occurring in the oscillating movement indicated at 6 in Figure 1, said membrane carrying radially the preponderant part of the bearing forces of any direction. In this way, higher stresses by breaking strain or pressure on the membrane are eliminated and any small force may cause bending of the membrane with a continuous equalization of tensions, as the membrane is not stiff to pressure and does not form webs on its inner or outer surface.

In carrying out my invention, I use an elastic membrane which is not rigid under pressure, has no webs and is provided with annular strengthening rings in combination with two concentrically arranged, divided supporting or carrying rings. The outer ring transmits the bearing forces acting thereon by the tension of the membrane as a girder to the support of the bearing. As slide surface 7 (see Fig. 2) is carried by the elastic membrane 10, neither a canting pressure at 3 of a stationary bearing surface, nor the harmful effect of an oscillating Sellers bearing occurs in constructions embodying my invention.

Figure 2:
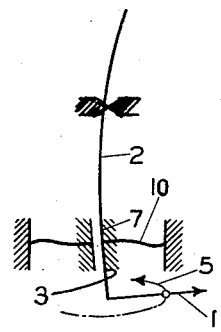
Figure 2 illustrates diagrammatically the principle of the present invention.

Figure 2 illustrates diagrammatically elastic membrane 10 after its deflection by force 1. The longer the slide surface 7 and the larger the radius of membrane 10 is, the smaller the force acting at 3 will be at a given bearing play and bearing distance prior to complete support by the slide surface. In Figure 1 the force acting on the cant has a harmful effect all the time, while in the construction shown in Figure 2, this takes place only until bending of the membrane is completed, i. e., during the start of the machine.

If during operation, force 1 moves in the direction of arrow 5 in Figure 2, slide surface 7 will not be under canting pressure and oscillation of the Sellers bearing is replaced by elastic deformation of the membrane. It will be understood from Figure 2 that shaft 2 may be bent and is axially displaceable.

In the structures embodying my invention, the slot of the bearing may be very small and this essentially facilitates sealing of the bearing, if necessary. This is also an advantage of my invention.

The small bearing slot and the permanent fit of the slide surfaces permits much smaller distances of several bearings from each other than in the case of conventional plain bearings.

Figures 3A, 3B:
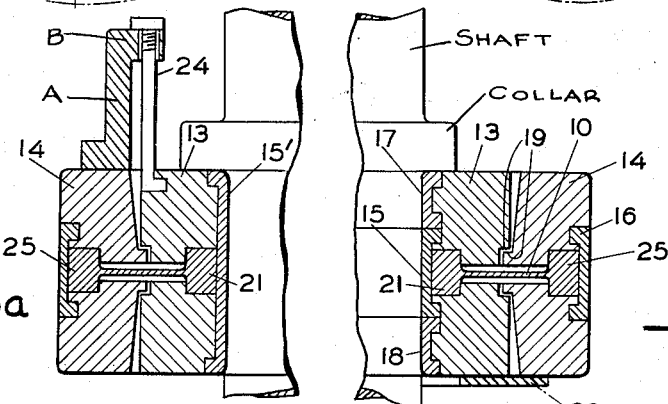
Figure 4:
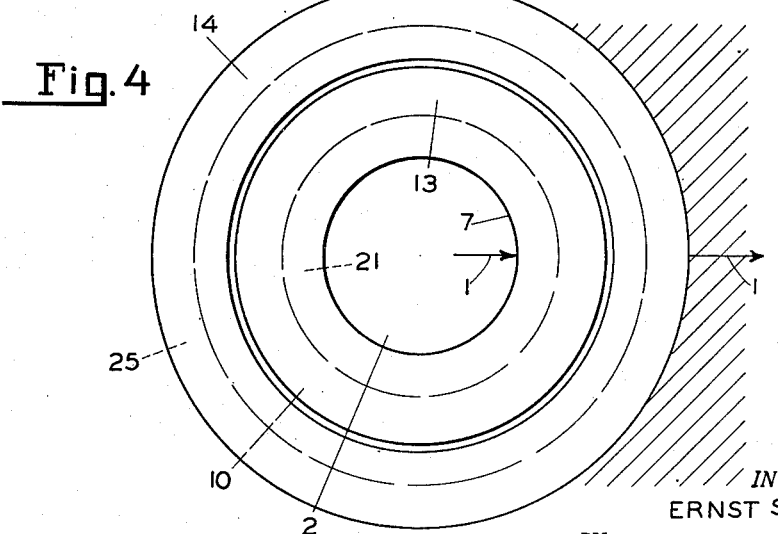

Figures 3a and 3b illustrate some embodiments of my invention. The circular membrane 10 consists of spring steel and has strengthened inner and outer annular edges 21, 25, so that the horizontal cross-section of membrane 10, viewed in Figures 3a and 3b, has the design of an I. According to a modification of my invention, the membrane may be reinforced, without additional strain under clamping compressing forces, by axial pole bolts passing through the strengthened edges. The membrane 10 shown in Figure 2 may be divided in two parts which are in contact with each other and form an I. Membrane 10 is carried in the manner shown in these figures by a divided inner ring 13 and a concentrically arranged, similar outer ring 14, the two halves of each divided ring being held together by a lining 15, 16 in Figure 3b. In this case, the shaft rotates on slide surfaces 17 and 18. The surfaces 15, 17 and 18 may also be formed as a unitary slide surface 15', as shown in Figure 3a.

In order to protect the membrane from excessive deflections, the mobility of ring 13 is limited by annular shoulders 19 of the membrane carriers. As a protection of the membrane from water and simultaneous prevention of oil leakage, sealing means, such as a pad or ring of rubber 20 may be used. For example, this sealing means consists of a rubber ring, the outer edge of which is tightly connected with carrying ring 14, while its inner edge is tightly connected with carrying ring 13.

One or both of the linings 15, 16 may be replaced by rivets, screws or other connecting means. In order to increase the limit of admissible deflections, instead of a single membrane, a membrane consisting of several thinner membranes may be used. In view of the high stresses of the membrane, the transition points between the membrane proper and its strengthened annular edges should be rounded off so that the tension occurring at these points should not exceed the tension in the membrane proper. Prior to its transition to rings 21, 25, the membrane 10 can be guided by carrying rings 13, 14 in such a manner that the admissible deflection of the membrane is not exceeded.

In contrast to roller bearings, the admissible load of bearings according to my invention is not dependent on the number of revolutions and, therefore, at equal load, the membrane bearing according to my invention is distinctly superior to roller bearings at high numbers of revolution. In the case of continued wear, the bearings of my invention need only replacement of the slide surfaces, because neither the membrane nor the carrying rings contain parts which are affected by friction.

Owing to the long elastic path of the forces in the membrane, the bearing according to the present invention is, under otherwise equal conditions, less sensitive to shock than roller bearings in which there is only a short elastic path of forces.

In contrast to sliding bearings with ball surface or to ball bearings and roller bearings, no axial forces are transmitted by the membrane in bearings according to the present invention, so that the shaft is displaceable. In order to carry also axial forces in an oscillating manner in the same bearing, ring 13 may be connected by means of a number of draw bars 24 as shown in Figure 3a with ring 14. The collar of the shaft for transmitting axial forces will then likewise lie in complete fit without canting pressure.

In order to carry axial forces in an oscillating manner in the bearing according to the invention, part 14 is provided with a circumferential carrier A. It is possible that instead of the circumferential carrier, a number of supporting arms can be provided each in rigid connection with ring 14. The upper part B of this carrier and the supporting arms respectively are connected with the inner ring 13 by a number of draw bars 24. Instead of these bars flexible steel strips of steel wire ropes can also be used. It will be understood that in case of an axial force exerted by the shaft on the bearing the collar will rest with its annular lower surface on the upper surface of ring 13 whereby all draw bars 24 will have a uniform loading. If, however, the shaft inclines with respect to its vertical position the inner ring 13 of the bearing inclines together with the shaft. In view of the fact that an elongation of means 24 is not possible, only means 24 are stressed and this lies on that part of the bearing towards which the shaft is inclined. This results in a total relieving of the draw means 24 on the opposite side which will either slide upwardly in bores in upper part B of carrier A (in the case of rigid bars) or will bend slightly (in the case of flexible means such as ropes or straps).

The slide surface may be lubricated at any bearing axis through the outer ring 14, because pad or ring 20 prevents the escape of oil, so that oil can flow to the slide surfaces through openings in the inner ring 13. In the case of a horizontal axis of the bearing, lubricating rings can be arranged on both sides of the membrane within the inner ring 13, while in the case of a vertical axis of the bearing, the oil can be supplied simply from above to the bearing surfaces and flows out at the bottom. Outer ring 14 may be connected with inner ring 13 or the bearing support may be connected with inner ring 13 by means of an elastic tube which can follow the slight movements of the inner ring, and in this arrangement lubrication with oil can take place under pressure.

It will be understood that my present invention is not limited to the specific constructions, designs and elements described above and may be carried out with various modifications without departing from the scope of the invention as defined in the appended claims.

What is claimed is:

1. In combination with a slide bearing, a circular elastic membrane for taking up forces acting on said bearing, said membrane being arranged transversely to the axis of the bearing and provided with a strengthened circular inner edge and a strengthened outer circular edge, an inner circular ring and a concentrical outer circular ring arranged substantially co-axially with said bearing, said rings being divided transversely to the axis of the bearing, enclosing said membrane and holding circumferentially between their divided parts the inner and outer circular edge of said membrane, said divided parts of the inner and outer ring, respectively, being connected with each other and a slide surface for the bearing applied to the inner surface of said inner ring.

2. In combination with a slide bearing, a circular elastic membrane for taking up forces acting on said bearing, said membrane being arranged transversely to the axis of the bearing and provided with a strengthened inner circular edge and a strengthened outer circular edge, said membrane and its strengthened inner and outer edge having the form of an I in cross-section, an inner circular ring and a concentrical outer circular ring arranged substantially co-axially with said bearing, said rings being divided transversely to the axis of the bearing, enclosing said membrane and holding circumferentially between their divided parts the inner and outer circular edge of said membrane, said divided parts of the inner and outer ring, respectively, being connected with each other and a slide surface for the bearing applied to the inner surface of said inner ring.

3. In combination with a slide bearing, a circular elastic membrane for taking up forces acting on said bearing, said membrane being arranged transversely to the axis of the bearing and provided with a strengthened inner circular edge and a strengthened outer circular edge, said membrane and its strengthened inner and outer edge having the form of an I in cross-section, an inner circular ring and a concentrical outer circular ring arranged substantially co-axially with said bearing, said rings being divided transversely to the axis of the bearing and holding circumferentially between their divided parts the inner and outer circular edge of said membrane, linings connecting said divided parts of the inner and outer ring, respectively, with each other and a slide surface for said bearing applied to the inner surface of said inner ring.

4. In combination with a slide bearing, a circular elastic membrane for taking up forces acting on said bearing, said membrane being arranged transversely to the axis of the bearing and provided with a strengthened inner circular edge and a strengthened outer circular edge, said membrane and its strengthened inner and outer edge having the form of an I in cross-section, an inner circular ring and a concentrical outer circular ring arranged substantially co-axially with said bearing, said rings being divided transversely to the axis of the bearing, enclosing said membrane and holding circumferentially between their divided parts the inner and outer circular edge of said membrane, said divided parts of the inner and outer ring, respectively, being connected with each other, a slide surface for the bearing applied to the inner surface of said inner ring, said inner ring and said outer ring being provided with registering annular shoulders for limiting the deflection of the elastic membrane.

5. In combination with a slide bearing, a circular elastic membrane for taking up forces acting on said bearing, said membrane being arranged transversely to the axis of the bearing and provided with a strengthened inner circular edge and a strengthened outer circular edge, said membrane and its strengthened inner and outer edge having the form of an I in cross-section, an inner circular ring and a concentrical outer circular ring arranged substantially co-axially with said bearing, said rings being divided transversely to the axis of the bearing and enclosing and holding circumferentially between their divided parts the inner and outer circular edge of said membrane, said divided parts of the inner and outer ring, respectively, being connected with each other, a slide surface for the bearing applied to the inner surface of said inner ring, a slot extending in an angle of 90° to the membrane being formed between the outer surface of the inner ring and the inner surface of the outer ring.

6. In combination with a slide bearing, a circular elastic membrane for taking up forces acting on said bearing, said membrane being arranged transversely to the axis of the bearing and provided with a strengthened inner circular edge and a strengthened outer circular edge, said membrane and its strengthened inner and outer edge having the form of an I in cross-section, an inner circular ring and a concentrical outer circular ring arranged substantially co-axially with said bearing, said rings being divided transversely to the axis of the bearing and enclosing and holding circumferentially between their divided parts the inner and outer circular edge of said membrane, said divided parts of the inner and outer ring, respectively, being connected with each other, a slide surface for the bearing applied to the inner surface of said inner ring, a slot extending in an angle of 90° to the membrane being formed between the outer surface of the inner ring and the inner surface of the outer ring, said slot being sealed by an elastic sealing means.

7. In combination with a slide bearing, a circular elastic membrane for taking up forces acting on said bearing, said membrane being arranged transversely to the axis of the bearing and provided with a strengthened inner circular edge and a strengthened outer circular edge, said membrane and its strengthened inner and outer edge having the form of an I in cross-section, an inner circular ring and a concentrical outer circular ring arranged substantially co-axially with said bearing, said rings being divided transversely to the axis of the bearing, enclosing said membrane and holding between their divided parts the inner and outer circular edge of said membrane, said divided parts of the inner and outer ring, respectively, being connected with each other, a slide surface for the bearing applied to the inner surface of said inner ring, one of said rings being connected with the other in axially movable manner.

8. In combination with a slide bearing, a circular elastic membrane for taking up forces acting on said bearing, said membrane being arranged substantially in an angle of 90° to the axis of the bearing and provided with a strengthened inner circular edge and a strengthened outer circular edge, said membrane and its strengthened inner and outer edge having the form of an I in cross-section, an inner circular ring and a concentrical outer circular ring arranged substantially co-axially with said bearing, said rings being divided transversely to the axis of the bearing, enclosing said membrane and holding between their divided parts the inner and outer circular edge of said membrane, said divided parts of the inner and outer ring, respectively, being connected with each other, a slide surface for the bearing applied to the inner surface of said inner ring.

References Cited in the file of this patent

UNITED STATES PATENTS

| Number | Name | Date |
|---|---|---|
| 1,042,114 | Hitchcock | Oct. 22, 1912 |
| 1,384,173 | Wilkander | July 12, 1921 |
| 1,816,460 | Aller | July 28, 1931 |
| 2,113,335 | Wallgren | Apr. 5, 1938 |